(12) United States Patent
Huang et al.

(10) Patent No.: US 10,790,625 B2
(45) Date of Patent: Sep. 29, 2020

(54) TRANSMISSION LINE SET

(71) Applicant: KUNSHAN JUNLEI ELECTRONIC CO., LTD., Kunshan (CN)

(72) Inventors: Ji Huang, Kunshan (CN); Biao Pan, Kunshan (CN)

(73) Assignee: KUNSHAN JUNLEI ELECTRONIC CO., LTD., Kunshan (CN)

( * ) Notice: Subject to any disclaimer, the term of this patent is extended or adjusted under 35 U.S.C. 154(b) by 0 days.

(21) Appl. No.: 16/374,013

(22) Filed: Apr. 3, 2019

(65) Prior Publication Data

US 2020/0194945 A1  Jun. 18, 2020

(30) Foreign Application Priority Data

Dec. 13, 2018 (TW) .............................. 107216920 U (51) Int. Cl.
| | |
|---|---|
| *H01R 24/60* | (2011.01) |
| *G06F 13/38* | (2006.01) |
| *H01B 7/17* | (2006.01) |
| *H01R 13/04* | (2006.01) |
| *H01R 13/64* | (2006.01) |
| *H01R 13/66* | (2006.01) |
| *H04B 3/54* | (2006.01) |

(52) U.S. Cl.
CPC ............. *H01R 24/60* (2013.01); *G06F 13/38* (2013.01); *H01B 7/17* (2013.01); *H01R 13/04* (2013.01); *H01R 13/64* (2013.01); *H01R 13/66* (2013.01); *H04B 3/54* (2013.01); *H04B 2203/5462* (2013.01)

(58) Field of Classification Search
CPC ........ H01R 24/60; H01R 13/04; H01R 13/64; H01R 13/66; H01R 24/62; H01R 24/84; H01R 13/5219; G06F 13/38; H04B 3/54; H04B 2203/5462; H01B 7/17
USPC ................................ 439/676, 284, 344, 677
See application file for complete search history.

(56) References Cited

U.S. PATENT DOCUMENTS

| | | | | |
|---|---|---|---|---|
| 6,102,745 A | * | 8/2000 | Schultz .................. | H01R 27/02 439/638 |
| 7,364,445 B1 | * | 4/2008 | Ni ......................... | H05K 5/0278 439/140 |
| 7,618,262 B2 | * | 11/2009 | Fogg .................. | H01R 13/6594 439/65 |
| 7,670,170 B2 | * | 3/2010 | Henry ................ | H01R 13/7172 439/490 |

(Continued)

*Primary Examiner* — Travis S Chambers
(74) *Attorney, Agent, or Firm* — Muncy, Geissler, Olds & Lowe, P.C.

(57) ABSTRACT

A transmission line set includes male plug transmission lines, having a first protruding portion and a second protruding portion, a third groove in a ring-shape formed between the first protrusion potion and the second protruding portion, at least two upper conductive interfaces and at least two lower conductive interfaces being symmetrically conductive with each other at opposite angles; and female plug transmission lines, having a third protruding portion and a fourth protruding portion, a fourth protruding portion formed in a ring shape and a second recess formed between the fourth protruding portion and the third protrusion, at least two upper conductive elastic sheets and at least two lower conductive elastic sheets being symmetrically conductive with each other at opposite angles.

11 Claims, 5 Drawing Sheets

(56) References Cited

U.S. PATENT DOCUMENTS

| | | | |
|---|---|---|---|
| 7,785,140 B2* | 8/2010 | Henry | H01R 23/6873 |
| | | | 439/541.5 |
| 9,472,911 B2* | 10/2016 | Little | H01R 24/60 |
| 2005/0159040 A1* | 7/2005 | Brunker | H04W 72/02 |
| | | | 439/497 |
| 2007/0232139 A1* | 10/2007 | Garcia | H01R 13/40 |
| | | | 439/587 |
| 2011/0269329 A1* | 11/2011 | Pocrass | H01R 24/64 |
| | | | 439/345 |
| 2018/0358736 A1* | 12/2018 | Gu | H01R 13/518 |

* cited by examiner

TRANSMISSION LINE SET

BACKGROUND OF THE INVENTION

1. Field of the Invention

The present invention relates to a transmission line set, and more particularly to a transmission line set having a fool-proof structure.

2. Description of the Related Art

The advent of the Internet of thing (IOT) appears, so that everything can be connected to the Internet. In other words, in addition to computers and mobile devices, many devices have the ability to connect to the Internet. However, the basic requirement for connecting to the Internet is to be able to pass signals from various devices.

At present, signals of devices such as electrical equipment, electric vehicles, electric bicycles, and mechanical control systems are transmitted, usually through transmission lines. Power lines and transmission lines are generally configured separately. Therefore, the traditional signal lines such as RS232, RS485, I2S, I2C, USB, etc. become standard usable signal lines. However, these standard transmission lines do not have the ability to transmit power. In other words, the use of these standard signal lines is necessary to transmit with a power line. In this way, it will cause a lot of problems and high cost.

In addition, in the interior of electrical equipment, electric vehicles, electric bicycles, and mechanical control systems, when additional signal lines or power lines are required, it is often required to be achieved through wiring, which makes construction difficult, and may damage equipment due to wiring errors. In addition, for water-proof and fool-proof, there are often a variety of institutional-based designs. At present, the fool-proof and water-proof of signal line use special mechanisms such as buckles, anti-stay bumps, special design pins and so on. The water-proof design is mostly designed with a covered male and female plug. Most of these designs have a situation where mass production is not easy.

Therefore, to develop a transmission line set that does not have wiring errors and can be easily wired, and has a function of signal transmission or even power transmission, and is capable of being water-proof and mass-produced, becomes a an important technology development direction of signal line of the Internet era.

BRIEF SUMMARY OF THE INVENTION

In view of the above problems of the prior art, the present invention provides a transmission line set using a pair of male plug transmission lines and a pair of female plug transmission lines, and the conductive interface of the pair of male plugs and the conductive elastic sheets of the pair of female plugs are designed to be vertically symmetrical, so that the pair of male plugs and the pair of female plugs can be docked and quickly connected. And, due to the design of the pair of male plugs and the pair of female plugs, the present invention can achieve special technical effects of plugging and unplugging quickly and that wiring are not easy to fall off.

The present invention discloses a transmission line set for power transmission or signal transmission, comprising: a pair of male plug transmission lines, having a first protruding portion and a second protruding portion to form a pair of male plugs, the first protruding portion being disposed at a center of the pair of male plugs, the second protruding portion being in a ring type, a third groove in a ring-shape formed between the first protrusion portion and the second protruding portion, the first protruding portion having upper and lower surfaces, each configured with at least two upper conductive interfaces and at least two lower conductive interfaces, the at least two upper conductive interfaces and the at least two lower conductive interfaces being symmetrically conductive with each other at opposite angles; and a pair of female plug transmission lines, having a third protruding portion and a fourth protruding portion to form a pair of female plug, the third protruding portion forming a first groove in a ring type, the first groove being located at a center of the pair of female plugs, a fourth protruding portion formed in a ring shape and a second recess formed between the fourth protruding portion and the third protrusion, the third protruding portion having upper and lower surfaces, each configured with at least two upper conductive elastic sheets and at least two lower conductive elastic sheets, the at least two upper conductive elastic sheets and the at least two lower conductive elastic sheets being symmetrically conductive with each other at opposite angles; wherein, the first groove receives the first protruding portion, the second groove receives the second protruding portion, the third groove receive the third protruding portion, and the at least two upper conductive portions and the at least two lower conductive interfaces and the at least two upper conductive elastic sheets the at least two lower conductive elastic sheets all have the same number.

The detailed features and advantages of the present invention are described in detail in the following description of the embodiments of the present invention. The related objects and advantages of the present invention will be readily understood by those skilled in the art.

DETAILED DESCRIPTION OF THE INVENTION

The present invention uses a pair of male plug transmission lines and a pair of female plug transmission lines, and the conductive interface of the pair of male plugs and the conductive elastic sheet of the pair of female plugs are designed to be vertically symmetrical, so that the pair of male plugs and the pair of female plugs can be docked and fast-connected; and due to the design of the pair of male plugs and the pair of female plugs, the present invention can achieve special technical effects such as quick plugging, stable wiring, easy to fall off, water-proof, and easy mass production.

Figure 1A:
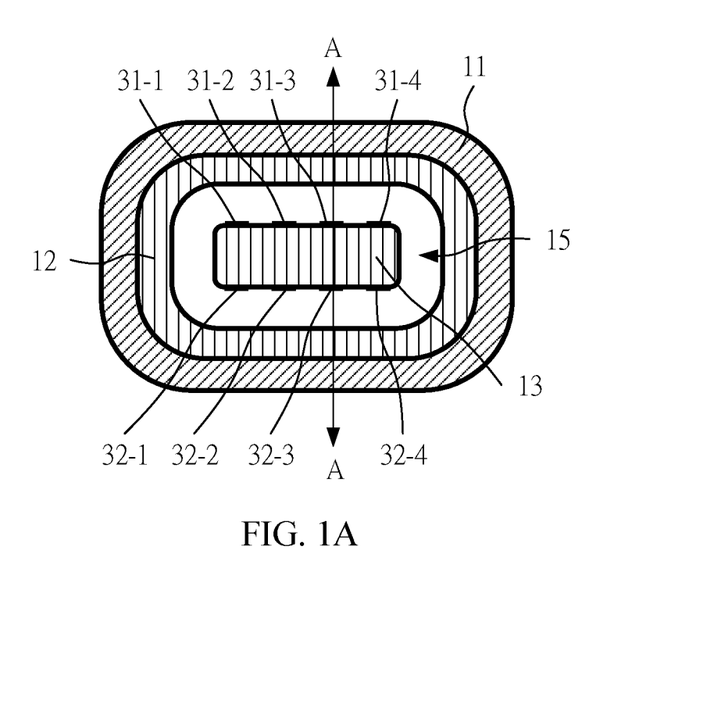
FIG. 1A-1C are front, cross-sectional and perspective views of a pair of male plug transmission line 1 in the transmission line set of the present invention.
Figure 1B:
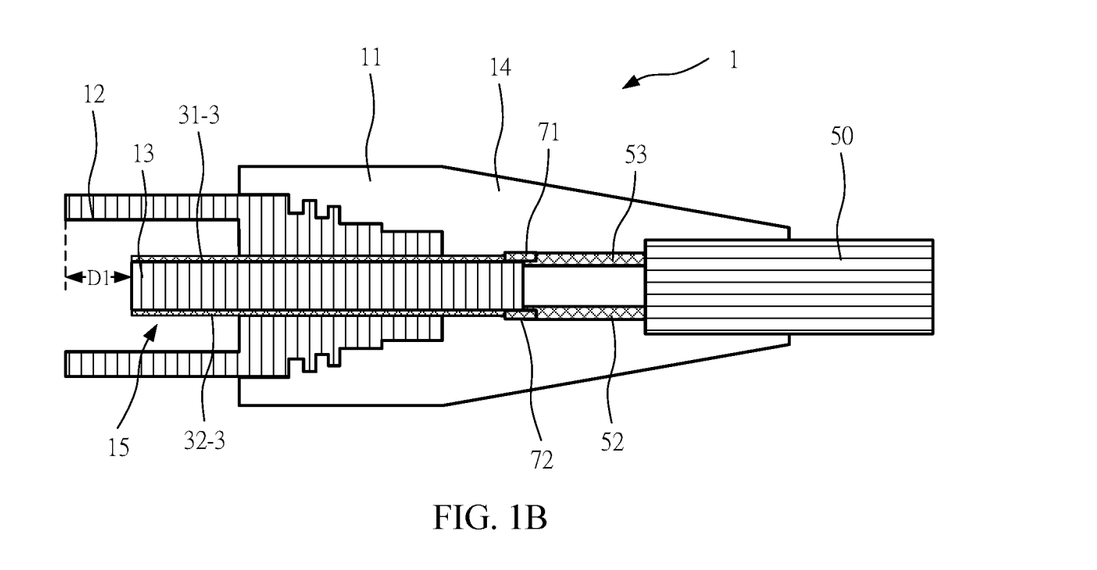
Figure 1C:
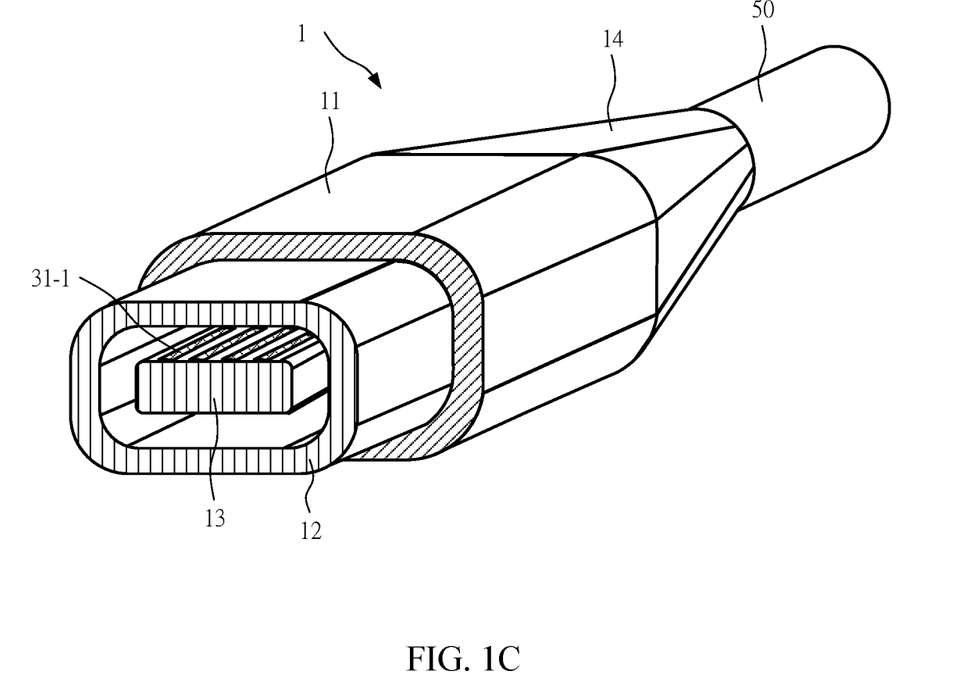
Figure 3A:
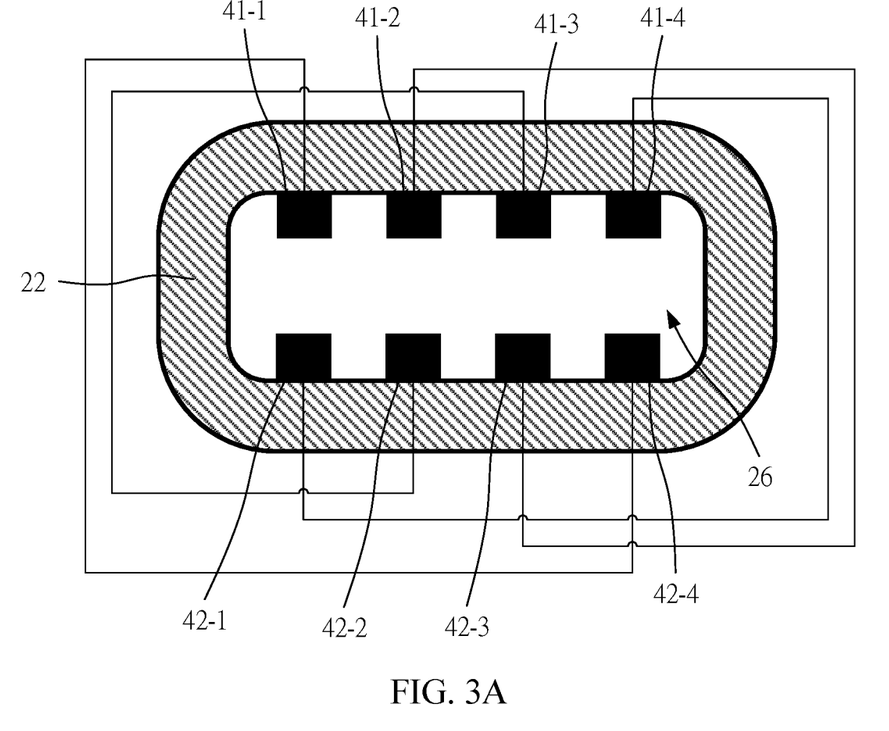
FIG. 3A to FIG. 3B are corresponding schematic diagrams showing the conductive interface and the conductive elastic sheet of the transmission line set of the present invention.

First, please refer to FIG. 1A to FIG. 1C, which are front, cross-sectional and perspective views of a pair of male plug transmission line 1 in a transmission line set of the present invention. The pair of male plugs transmission line 1 has a first protruding portion 13 and a second protruding portion 12 to form a pair of male plugs, and includes other components such as the above conductive interfaces 31-1, 31-2, 31-3, 31-4, the lower conductive interface 32-1, 32-2, 32-3, 32-4, the first cladding layer 11, the second cladding layer 14, the wire cladding portion 50, the wires 52, 53, and the welded portion 71, 72, etc. The first protruding portion 13 is disposed at the center of the pair of male plugs, and the second protruding portion 12 is in a ring type and annular. The first protruding portion 13 and the second protruding portion 12 form a third groove 15 with a ring type. The protruding portion 13 has upper and lower surfaces, and each of the four upper conductive interfaces 31-1, 31-2, 31-3, 31-4 and each of four lower conductive interfaces 32-1, 32-2, 32-3, 32-4 are disposed. The four upper conductive interfaces 31-1, 31-2, 31-3, 31-4 and the four lower conductive interfaces 32-1, 32-2, 32-3, 32-4 are symmetrically conductive with each other at opposite angles, as shown in FIG. 3A. Thus, after the so-called upper conductive interfaces 31-1, 31-2, 31-3, and 31-4 are turned over, the order of wiring is the same as that of the lower conductive interfaces 32-1, 32-2, 32-3, and 32-4. The wiring sequence will be identical. In this way, errors caused by reverse wiring can be prevented.

Further, since the first protruding portion 13 has both upper and lower surfaces and is planar, the welded portions 71, 72 and the like are easily automated produced, and thus the mass production is facilitated.

For example, the signals represented by the four upper conductive interfaces 31-1, 31-2, 31-3, 31-4 are power supply, signal 1, signal 2 and ground, respectively; then the signals represented by four lower conductive interfaces 32-1, 32-2, 32-3, 32-4 are ground, signal 2, signal 1, and power. This is the concept that the two sides of conductive interfaces are symmetrically conductive with each other at opposite angles.

Figure 2A:
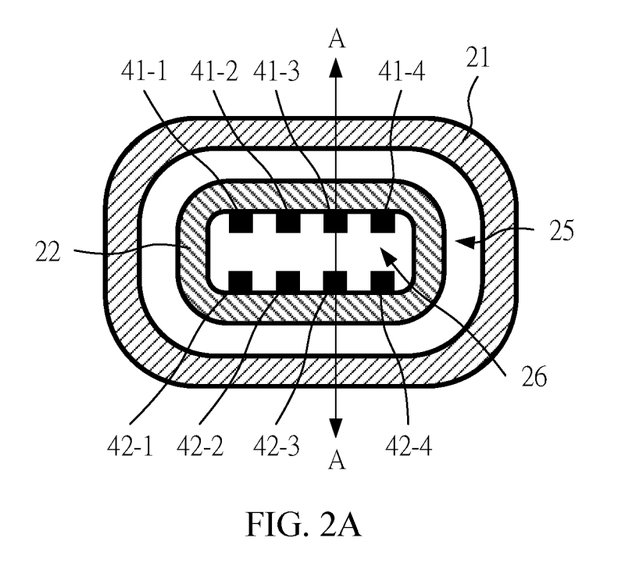
FIG. 2A-2C are front, cross-sectional and perspective views of a pair of female plug transmission line 2 in the transmission line set of the present invention.
Figure 2B:
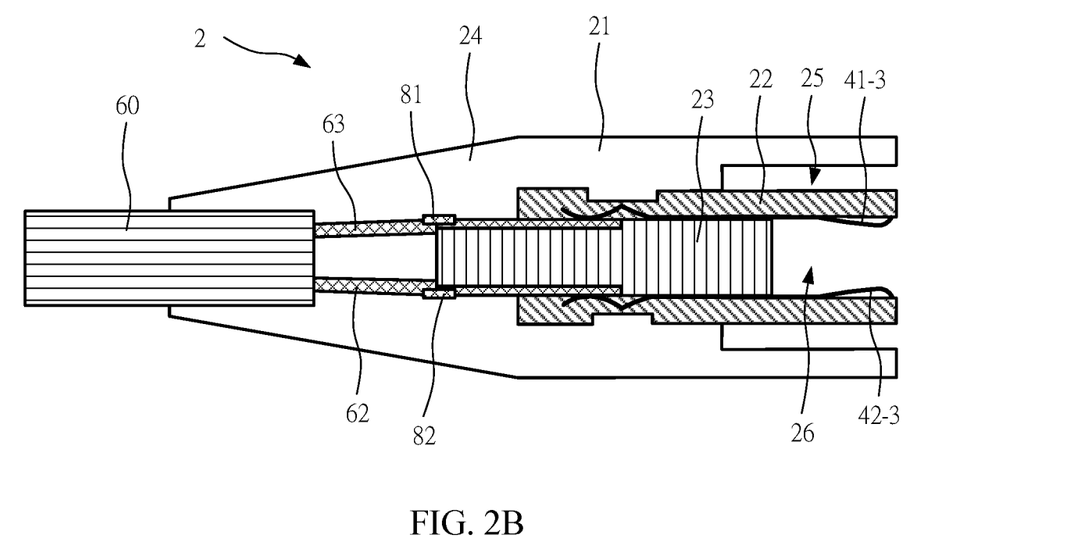
Figure 2C:
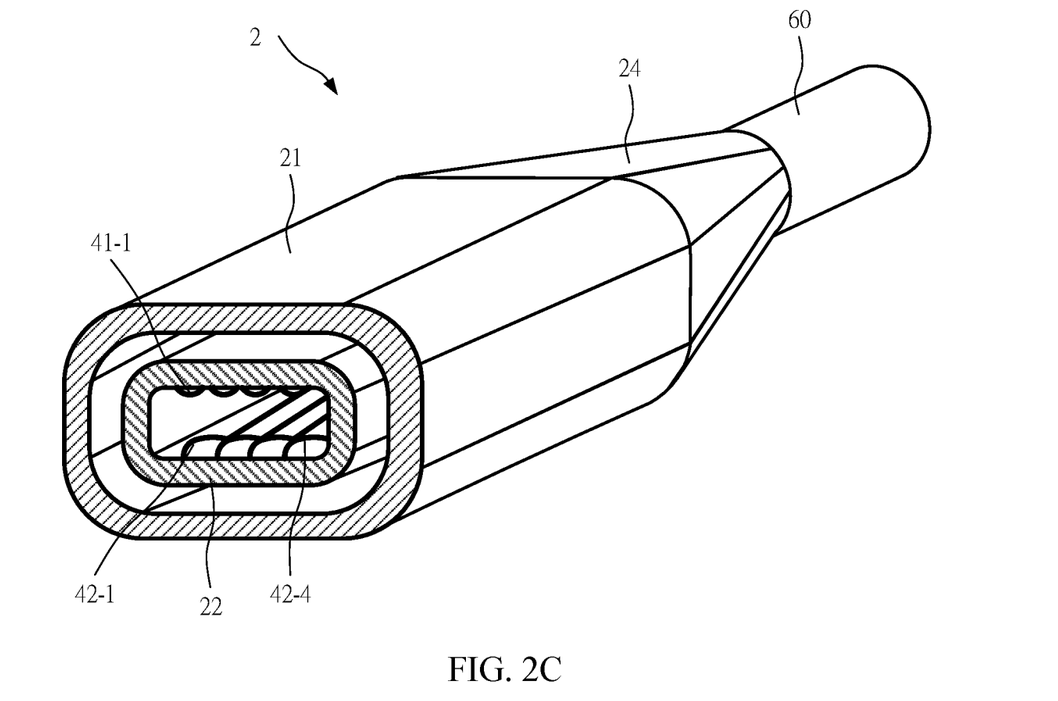
Figure 3B:
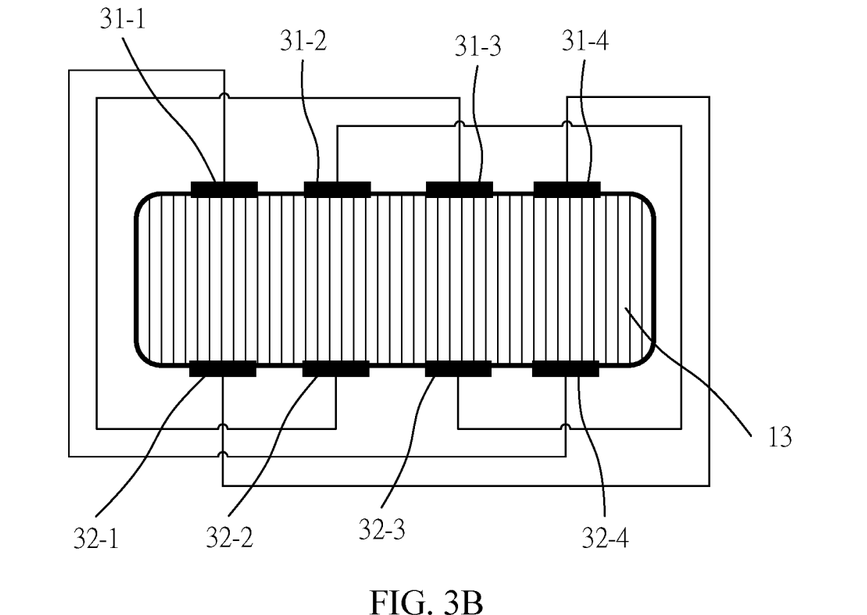

Next, please refer to FIG. 2A to FIG. 2C, which are front, cross-sectional and perspective views of the pair of female plug transmission line 2 in the transmission line set of the present invention. The pair of female plug transmission line 2 has a third protruding portion 22 and a fourth protruding portion 21 to form a pair of female plugs, and includes other components such as the conductive elastic sheets 41-1, 41-2, 41-3 and 41-4, the lower conductive elastic sheets 42-1, 42-2, 42-3 and 42-4, the third cladding layer 24, the wire covering portion 60, the wires 62, 63, and the welded portions 81, 82, the elastic sheet column 23 and so on. The third protruding portion 22 is formed in a ring type and annular to form a first groove 26, and the first groove 26 is located at the center of the pair of female plugs. The fourth protruding portion 21 is formed in a ring type and annular, and a second groove 25 is formed between the fourth protruding portion 21 and the third protruding portion 22. The inner surface of the third protruding portion 21 has upper and lower inner surfaces, each disposes the four upper conductive elastic sheets 41-1, 41-2, 41-3, 41-4 and at least two lower conductive elastic sheets 42-1, 42-2, 42-3, 42-4. The four upper conductive elastic sheets 41-1, 41-2, 41-3, 41-4 and the four lower conductive elastic sheets 42-1, 42-2, 42-3, 42-4 are symmetrically conductive with each other at opposite angles, as shown in FIG. 3B. Thus, after the so-called upper conductive elastic sheets 41-1, 41-2, 41-3, 41-4 are turned over, the order of wiring is the same as that of the lower conductive elastic sheets 42-1, 42-2, 42-3, and 42-4. The wiring sequence will be identical. In this way, errors caused by reverse wiring can be prevented.

Further, since the inner surface of the third projecting portion 13 has upper and lower surfaces and is planar, the welded portions 81, 82 and the like are easily automated produced and the mass production is facilitated.

For example, the signals represented by the four upper conductive elastic sheets 41-1, 41-2, 41-3, and 31-4 are ground, signal 2, signal 1, and power source, respectively; then the signals represented by the four lower conductive elastic sheets 42-1, 42-2, 42-3, and 42-4 are power, signal 1, signal 2, and ground, respectively. This is the concept that the two sides of conductive interfaces are symmetrically conductive with each other at opposite angles.

The correspondence between the conductive interfaces and the conductive elastic sheets are mapped to each other (the same amount), and are organized as follows:

| upper conductive interface 31-1 | upper conductive interface 31-2 | upper conductive interface 31-3 | upper conductive interface 31-4 |
|---|---|---|---|
| power | signal 1 | signal 2 | ground |
| lower conductive interface 32-1 | lower conductive interface 32-2 | lower conductive interface 32-3 | lower conductive interface 32-4 |
| ground | signal 2 | signal 1 | power |
| upper conductive elastic sheets 41-1 | upper conductive elastic sheets 41-2 | upper conductive elastic sheets 41-3 | upper conductive elastic sheets 41-4 |
| ground | signal 2 | signal 1 | power |
| lower conductive elastic sheets 42-1 | lower conductive elastic sheets 42-1 | lower conductive elastic sheets 42-1 | lower conductive elastic sheets 42-1 |
| power | signal 1 | signal 2 | ground |

Figure 4:
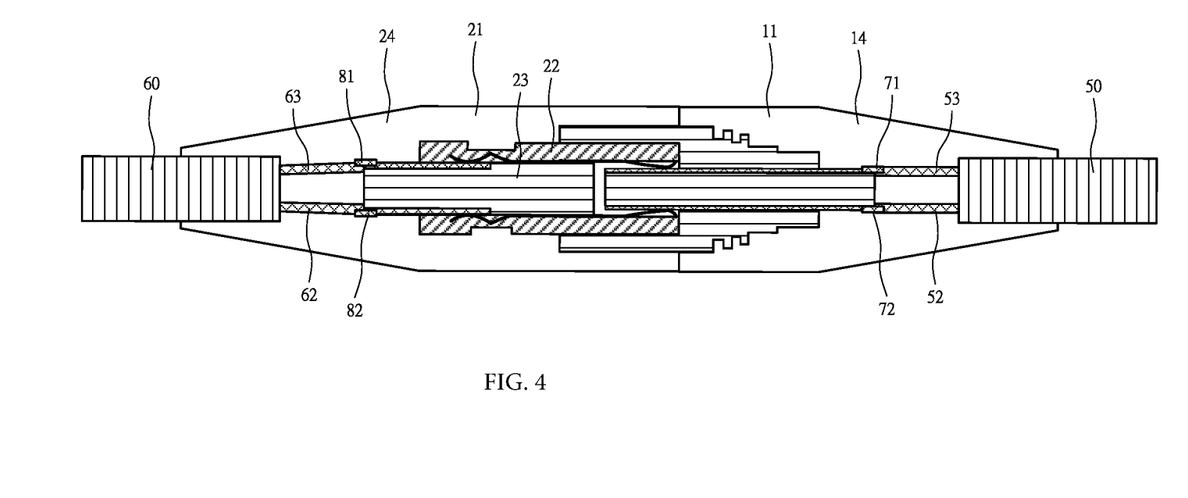
FIG. 4 is a schematic view showing the plugging of the pair of male plugs transmission line 1 and the pair of female plugs transmission line 2 of the transmission line set of the present invention.

Next, please co-referring to FIG. 1B, FIG. 2B and FIG. 4. For the pair of male plug transmission line 1 and the pair of female plug transmission line 2, the first groove 26 of the pair of female plug transmission line 2 can accommodate the pair of male plugs transmission line 1. The first protruding portion 13 of the pair of female plug transmission line 2 can accommodate the second protruding portion 12 of the pair of male plugs transmission line 1; in turn, the third groove 15 of the pair of male plug transmission line 1 can accommodate the third protruding portion 22 of the pair of female plugs transmission line 2. Thus, the design of the pair of male plug transmission line 1 and the pair of female plug transmission line 2 form a triple clamping mechanism, so that the pair of male plug transmission line 1 and the pair of female plug transmission line 2 are combined with each other, and not easy to fall off. It is a major innovative feature for the present invention.

In addition, in the embodiment of FIGS. 1B and 1C, the protruding length of the first protruding portion 13 of the pair of male plugs transmission line 1 is shorter than the protruding length of the second protruding portion 12. Thus, it constitute a protruding section of the second protruding portion 12 and the protruding section of the first protrusion portion 13 to form a distance D1. This design protects the four upper conductive interfaces 31-1, 31-2, 31-3, 31-4 and the four lower conductive interfaces 32-1, 32-2, 32-3, 32-4 among the first protruding portion to be not easy to expose and suffer damage, and forms a high impedance condition.

In addition, the second protruding portion 12 and the third protruding portion 22 can be made of a plastic material, and the fourth protruding portion 21 can be made of a rubber material.

Alternatively, the second protruding portion 12, the third protruding portion 22 and the fourth protruding portion 21 are made of a plastic material.

The above embodiment is an embodiment in which four upper conductive interfaces, four lower conductive interfaces, four upper conductive elastic sheets and four lower conductive elastic sheets are used. For other embodiments of the present invention, more than two upper conductive interfaces, lower conductive interfaces, upper conductive elastic sheets, and lower conductive elastic sheets may be combined. For example, two to be a group include a power line and a ground line. For example, three to be a group include a power line, a ground line, and a signal line. For example, two to be a group include a first signal line and a second signal line. For example, three to be a group include a first signal line, a second signal line, and a third signal line. And, it is so on and so forth.

While the invention has been disclosed in the foregoing preferred embodiments, they are not intended to limit the present invention, and one skilled in the art, without departing from the spirit and scope of the present disclosure, may make various changes or modifications. Therefore the scope of the present invention is best defined by the appended claims.

What is claimed is:

1. A transmission line set for power transmission or signal transmission, comprising:
   a male plug transmission line, having a first protruding portion and a second protruding portion to form a male plug, the first protruding portion being disposed at a center of the male plug, the second protruding portion being in a ring type, a third groove in a ring-shape formed between the first protrusion potion and the second protruding portion, the first protruding portion having upper and lower surfaces, each configured with at least two upper conductive interfaces and at least two lower conductive interfaces, the at least two upper conductive interfaces and the at least two lower conductive interfaces being symmetrically conductive with each other at opposite angles; and
   a female plug transmission line, having a third protruding portion and a fourth protruding portion to form a female plug, the third protruding portion forming a first groove in a ring type, the first groove being located at a center of the female plug, the fourth protruding portion formed in a ring shape and a second groove formed between the fourth protruding portion and the third protruding portion, the third protruding portion having upper and lower surfaces, each configured with at least two upper conductive elastic sheets and at least two lower conductive elastic sheets, the at least two upper conductive elastic sheets and the at least two lower conductive elastic sheets being symmetrically conductive with each other at opposite angles;
   wherein, the first groove receives the first protruding portion, the second groove receives the second protruding portion, the third groove receive the third protruding portion, and the at least two upper conductive interfaces and the at least two lower conductive interfaces and the at least two upper conductive elastic sheets the at least two lower conductive elastic sheets all have the same number,
   wherein the fourth protruding portion has an outer surface that forms an outermost surface of the female plug transmission line when viewed in a longitudinal direction of the female plug transmission line,
   wherein shapes of the first protruding portion and the second protruding portion of the male plug are each vertically and horizontally symmetrical over the center of the male plug, and
   wherein shapes of the third protruding portion and the fourth protruding portion of the female plug are each vertically and horizontally symmetrical over the center of the female plug.

2. The transmission line set according to claim 1, wherein a protruding length of the first protruding portion is shorter than a protruding length of the second protruding portion, and thus a protruding section of the second protruding portion and a protruding section of the first protruding portion form a distance.

3. The transmission line set according to claim 1, wherein the second protruding portion and the third protruding portion are made of a plastic material.

4. The transmission line set according to claim 1, wherein the fourth protruding portion is made of a rubber material.

5. The transmission line set according to claim 1, wherein the second protruding portion, the third protruding portion, and the fourth protruding portion are made of a plastic material.

6. The transmission line set according to claim 1, wherein the at least two upper conductive interfaces and the at least two lower conductive interfaces comprise at least a power line and a ground line.

7. The transmission group according to claim 1, wherein the at least two upper conductive interfaces and the at least two lower conductive interfaces comprise at least a first signal line and a second signal line.

8. The transmission group according to claim 1, further comprising:
   a cladding layer surrounding the second protruding portion of the male plug transmission line, wherein
   a length from a tip end of the second protruding portion to a tip end of the cladding layer corresponds to a depth of the second groove.

9. The transmission group according to claim 1, further comprising:
   a cladding layer surrounding the second protruding portion of the male plug transmission line, wherein
   a cross-sectional shape of the cladding layer corresponds to a cross-sectional shape of the second protruding portion.

10. A transmission line set for power transmission or signal transmission, comprising:
    a male plug transmission line, having a first protruding portion and a second protruding portion to form a male plug, the first protruding portion being disposed at a center of the male plug, the second protruding portion being in a ring type, a third groove in a ring-shape formed between the first protrusion potion and the second protruding portion, the first protruding portion having upper and lower surfaces, each configured with at least two upper conductive interfaces and at least two lower conductive interfaces, the at least two upper conductive interfaces and the at least two lower conductive interfaces being symmetrically conductive with each other at opposite angles;

a female plug transmission line, having a third protruding portion and a fourth protruding portion to form a female plug, the third protruding portion forming a first groove in a ring type, the first groove being located at a center of the female plug, the fourth protruding portion formed in a ring shape and a second groove formed between the fourth protruding portion and the third protruding portion, the third protruding portion having upper and lower surfaces, each configured with at least two upper conductive elastic sheets and at least two lower conductive elastic sheets, the at least two upper conductive elastic sheets and the at least two lower conductive elastic sheets being symmetrically conductive with each other at opposite angles; and a cladding layer surrounding the second protruding portion of the male plug transmission line;

wherein, the first groove receives the first protruding portion, the second groove receives the second protruding portion, the third groove receive the third protruding portion, and the at least two upper conductive interfaces and the at least two lower conductive interfaces and the at least two upper conductive elastic sheets the at least two lower conductive elastic sheets all have the same number, wherein the fourth protruding portion has an outer surface that forms an outermost surface of the female plug transmission line when viewed in a longitudinal direction of the female plug transmission line, and wherein a length from a tip end of the second protruding portion to a tip end of the cladding layer corresponds to a depth of the second groove.

11. A transmission line set for power transmission or signal transmission, comprising:

a male plug transmission line, having a first protruding portion and a second protruding portion to form a male plug, the first protruding portion being disposed at a center of the male plug, the second protruding portion being in a ring type, a third groove in a ring-shape formed between the first protrusion potion and the second protruding portion, the first protruding portion having upper and lower surfaces, each configured with at least two upper conductive interfaces and at least two lower conductive interfaces, the at least two upper conductive interfaces and the at least two lower conductive interfaces being symmetrically conductive with each other at opposite angles;

a female plug transmission line, having a third protruding portion and a fourth protruding portion to form a female plug, the third protruding portion forming a first groove in a ring type, the first groove being located at a center of the female plug, the fourth protruding portion formed in a ring shape and a second groove formed between the fourth protruding portion and the third protruding portion, the third protruding portion having upper and lower surfaces, each configured with at least two upper conductive elastic sheets and at least two lower conductive elastic sheets, the at least two upper conductive elastic sheets and the at least two lower conductive elastic sheets being symmetrically conductive with each other at opposite angles; and a cladding layer surrounding the second protruding portion of the male plug transmission line;

wherein, the first groove receives the first protruding portion, the second groove receives the second protruding portion, the third groove receive the third protruding portion, and the at least two upper conductive interfaces and the at least two lower conductive interfaces and the at least two upper conductive elastic sheets the at least two lower conductive elastic sheets all have the same number, wherein the fourth protruding portion has an outer surface that forms an outermost surface of the female plug transmission line when viewed in a longitudinal direction of the female plug transmission line, and wherein a cross-sectional shape of the cladding layer corresponds to a cross-sectional shape of the second protruding portion.

* * * * *